United States Patent [19]

Kunihiro

[11] Patent Number: 5,802,245
[45] Date of Patent: Sep. 1, 1998

[54] RECORDING MEDIUM HAVING VIDEO DATA AND CORRESPONDING AUDIO DATA ALIGNED WITH PHYSICAL SEGMENTS

[75] Inventor: Hideto Kunihiro, Osaka, Japan

[73] Assignees: NEC Corporation, Tokyo; NEC Home Electronics, Ltd., Osaka, both of Japan

[21] Appl. No.: 531,854

[22] Filed: Sep. 21, 1995

Related U.S. Application Data

[62] Division of Ser. No. 225,457, Apr. 6, 1994, abandoned, which is a division of Ser. No. 48,207, Apr. 20, 1993, abandoned, which is a continuation of Ser. No. 603,054, Oct. 25, 1990, abandoned.

[30] Foreign Application Priority Data

Oct. 25, 1989 [JP] Japan .................. 1-276118

[51] Int. Cl.⁶ .................. H04N 5/76; H04N 5/92
[52] U.S. Cl. .................. 386/98; 386/101; 386/104; 360/48
[58] Field of Search .................. 358/335, 341, 358/342, 363; 360/18, 19.1, 33.1, 48, 50; 386/46, 112, 96, 124, 97–107, 109, 111; H04N 5/75, 5/92

[56] References Cited

U.S. PATENT DOCUMENTS

| | | | |
|---|---|---|---|
| 2,330,225 | 9/1943 | Lang | 358/335 |
| 4,227,213 | 10/1980 | Isobe | 386/101 |
| 4,544,960 | 10/1985 | Konishi | 360/35.1 |
| 4,777,537 | 10/1988 | Ueno et al. | 386/101 |
| 4,816,928 | 3/1989 | Sasaki et al. | 358/342 |
| 4,833,549 | 5/1989 | Yoshimoto et al. | 386/100 |
| 4,858,032 | 8/1989 | Okada et al. | 360/9.1 |
| 4,882,732 | 11/1989 | Kaminaga | 360/38.1 |
| 4,985,784 | 1/1991 | Tsuboi et al. | 358/342 |
| 4,992,885 | 2/1991 | Yoshio | 358/341 |
| 4,994,925 | 2/1991 | Yamashita et al. | 386/101 |
| 5,012,352 | 4/1991 | Yoshimura et al. | 386/98 |
| 5,027,222 | 6/1991 | Shinbo et al. | 358/330 |
| 5,070,503 | 12/1991 | Shikakura | 386/100 |
| 5,083,212 | 1/1992 | Owa et al. | 358/319 |
| 5,200,864 | 4/1993 | Dunn et al. | 360/48 |
| 5,559,608 | 9/1996 | Kunihiro | 360/48 |
| 5,568,328 | 10/1996 | Takahashi et al. | 386/112 |

*Primary Examiner*—Thai Tran
*Attorney, Agent, or Firm*—Sughrue, Mion, Zinn, Macpeak & Seas, PLLC

[57] ABSTRACT

A data recording system for recording in a CD-ROM or similar recording medium a data file containing data such as compressed audio and video data and an index file containing index data for searching the individual data of the data file. The data stored in the data file are recorded in a CD-ROM in three hierarchical stages, i.e., titles, scenes and shots or chapters, scenes and clips. The index file has a hierarchical format associated with that of the data file in order to manage the data of the data file in consecutive stages.

7 Claims, 8 Drawing Sheets

| CHAPTER 1 | | CHAPTER 2 | | | CHAPTER N | |
|---|---|---|---|---|---|---|
| ADDRESS OF CHAPTER 1 | NUMBER OF SECTORS OCCUPIED BY CHAPTER 1 | ADDRESS OF CHAPTER 2 | NUMBER OF SECTORS OCCUPIED BY CHAPTER 2 | ----- | ADDRESS OF CHAPTER N | NUMBER OF SECTORS OCCUPIED BY CHAPTER N |

RECORDING MEDIUM HAVING VIDEO DATA AND CORRESPONDING AUDIO DATA ALIGNED WITH PHYSICAL SEGMENTS

This is a divisional of application Ser. No. 08/225,457, filed Apr. 6, 1994, now abandoned, which is a divisional of Ser. No. 08/048,207, filed Apr. 20, 1993, now abandoned, which is a continuation of application Ser. No. 07/603,054, filed Oct. 25, 1990, abandoned.

BACKGROUND OF THE INVENTION

The present invention relates to a data recording system for recording in a CD-ROM or similar recording medium a data file containing data such as compressed audio and video data and an index file containing index data for searching the individual data of the data file. More particularly, the present invention is concerned with the formats of the data and index files.

Equipment of the type using optical disks has been developed in a variety of forms. Among the optical disks, digital audio disks in the form of compact disks (CD) are predominant in the audio disk market over traditional LP disks or similar grooved disks due to the non-contact playback and faithful sound reproduction capabilities. Today, extended applications of such CDs to personal computers and other various data processing equipment as mass storages are attempted to take advantage of the extremely great storage capacity and the ease of handling and replacement. For example, CR-ROMs, CD-Is (Interactive) and CD-ROM/XAs (Extended Architecture) are the recent achievements. Such a latest type of CD is capable of recording not only text, graphics and other still pictures but also moving pictures, sound and various kinds of codes in combination, and reproducing the individual data in an interactive fashion.

It has been customary to compress audio data and video data including still and moving pictures when it is desired to record them together in the above-described type of recording medium. The compression is successful in promoting rapid read-out of the individual data at the time of playback. Index data associated with the individual data are recorded in the medium together with the video data, so that the compressed audio and video data may be searched to read out desired data. A prerequisite is, therefore, that a data file containing the auido and video data and an index file containing the index data each be provided with a particular format that allows the data to be readily prepared, edited, recorded, reproduced, and searched at the time of reproduction. Formats and data recording systems which meet such a requirement have not been been reported yet. The problem with CD-Is and CD-ROM/XAs adopting a sector interleave system which uses the subcode of CDs is that they cannot record audio and video data efficiently and cannot easily synchronize the two different kinds of data in the event of playback.

SUMMARY OF THE INVENTION

It is therefore an object of the present invention to provide a data recording system capable of easily recording in a recording medium a data file which contains compressed audio and video data and an index file containing index data for searching the data file, and allowing desired data to be searched for with ease.

It is another object of the present invention to provide a data format of a data file containing compressed audio and video data to be recorded in a recording medium, and a data format of an index file containing index data for searching the individual recorded data.

It is another object of the present invention to provide a generally improved data recording system.

In accordance with the present invention, in a data recording system for recording in a recording medium a data file containing data including compressed audio data and compressed video data, and an index file containing index data for searching the data of the data file, the data contained in the data file have a hierarchical format, and the index file has a hierarchical format associated with that of the data file. The index file contains addresses on the basis of at least a minimum access unit of data.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

In illustrative embodiments of the present invention which will be described, data that may be recorded in a recording medium include various types of data such as text data in addition to audio and video data. These data can be handled in the same manner with no regard to their types by having their types designated. The embodiments, therefore, will concentrate on audio and video data that are considered most relevant thereto. While the recording medium is available in various forms such as a disk and a tape, the embodiments will be described in relation to a CD-ROM by way of example. Let it be assumed that the recording medium stores a data file containing compressed audio and video data and an index file containing index data for facilitating the search of the individual data of the data file.

A reference will be made to FIG. 1 for describing a procedure for compressing video data representative of a still or a moving picture and audio data. As shown, video data 101 is made up of consecutive frames or pictures $V_1$, $V_2$, $V_3$ and so on, while audio data 201 is constituted by sound A associated with the individual frames $V_1$, $V_2$, $V_3$ and so on of the video data 101. The sound A is not divided into frames since it has customarily not involved the concept of "frame". In the figure, the sound A is divided into frames in association with the pictures $V_1$, $V_2$, $V_3$ and so on for convenience's sake, whereby audio data 202 made up of frames or sounds $A_1$, $A_2$, $A_3$ and so on is generated. Such video data 101 and audio data 202 are compressed frame by frame to produce compressed video data 102 and compressed audio data 203. Specifically, the compressed video data 102 has compressed pictures $V'_1$, $V'_2$, $V'_3$ and so on and areas where no data exists as indicated by hatching, while the compressed audio data 203 has compressed sounds $A'_1$, $A'_2$, $A'_3$ and so on and areas where no data exists as also indicated by hatching. Subsequently, the hatched areas with no data are omitted from the compressed video and audio data 202 and 203. The resulting compressed video and audio data are combined on a frame basis to produce compressed data 300. The compressed data 300 is recorded in a medium which is implemented as a CD-ROM.

Hereinafter will be described illustrative embodiments of the present invention which record in a CD-ROM a data file including the compressed data 300, i.e., the compressed audio and video data and an index file including index data adapted to search the data 300.

Figure 2:
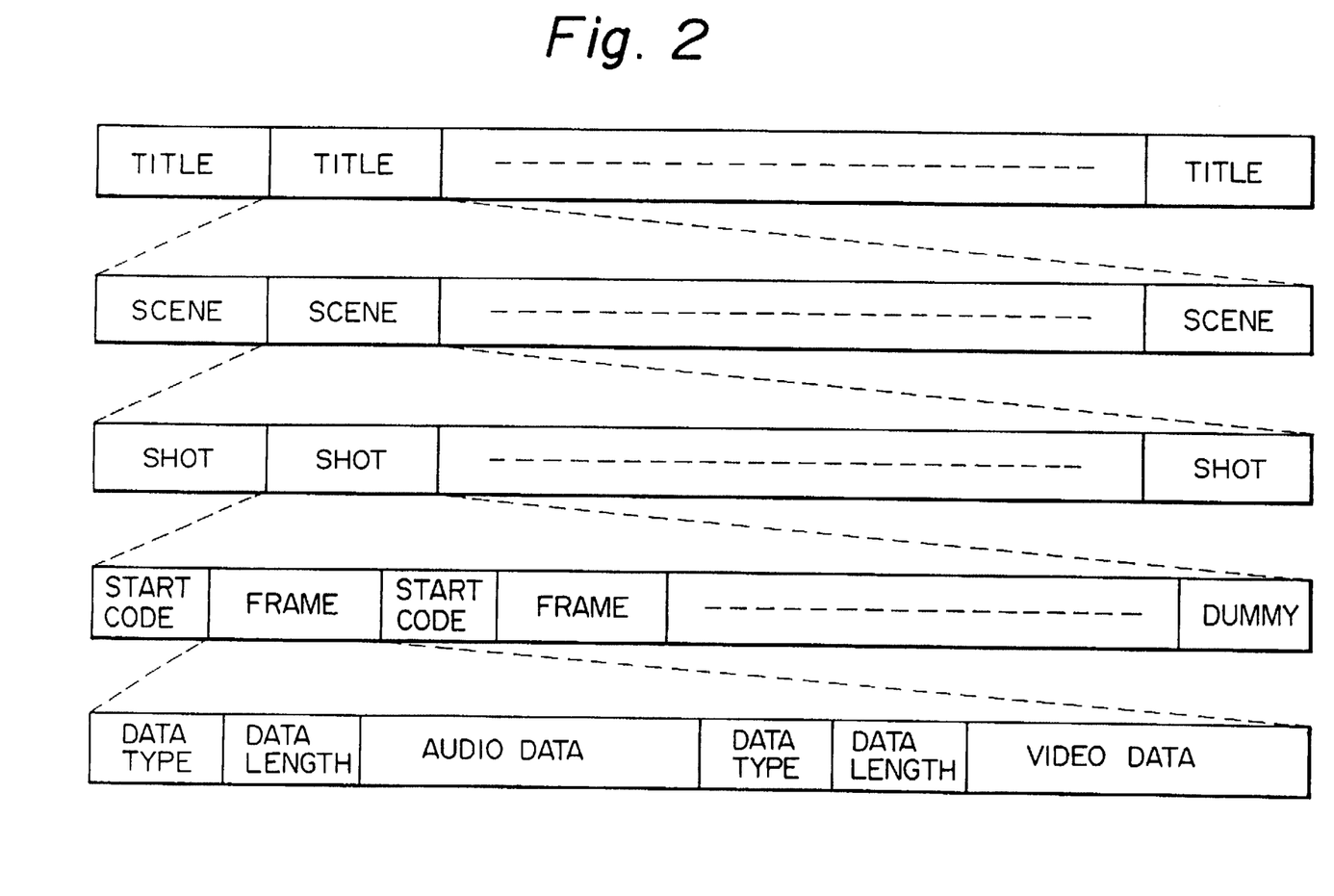
FIG. 2 shows a format of a data file representative of an embodiment of the data recording system in accordance with the present invention.
Figure 3:
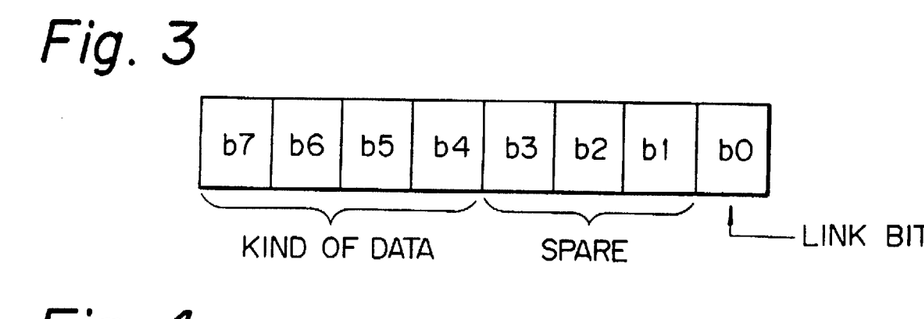
FIG. 3 shows a specific arrangement of a data type included in the format of FIG. 2.

A data file particular to a first embodiment of the present invention will be described first. As shown in FIG. 2, the data file has one or more titles each being constituted by one or more scenes. The scenes each has one or more shots which in turn have a plurality of frames and a dummy area each. In each shot, the frames each is headed by a start code to be distinguished from the others. Provided at the trailing end of the shot, the dummy area has dummy data therein so that the leading end of the shot coincides with the leading end of a block of the CD-ROM. The frames each contains audio and video data in the form of combinations of data types, data lengths and data. FIG. 3 shows a specific format representative of a data type. In FIG. 3, the data type is represented by 8-bit (one byte) data $b_7$ to $b_0$, and the kind of data is represented by the bits $b_7$ to $b_4$, for example. Specifically, the audio and video data may be represented by $b_7b_6b_5b_4 = 0010$ and $b_7b_6b_5b_4 = 0000$, respectively. The four bits $b_7$, $b_6$, $b_5$ and $b_4$ are followed by three spare bits $b_3$ to $b_1$ and a link bit $b_0$ which indicates the continuity of the frame. For example, the link bit $b_0$ may be "0" if data belonging to the same frame ends there or "1" if otherwise. The data length is representative of the number of bytes of data.

Figure 1:
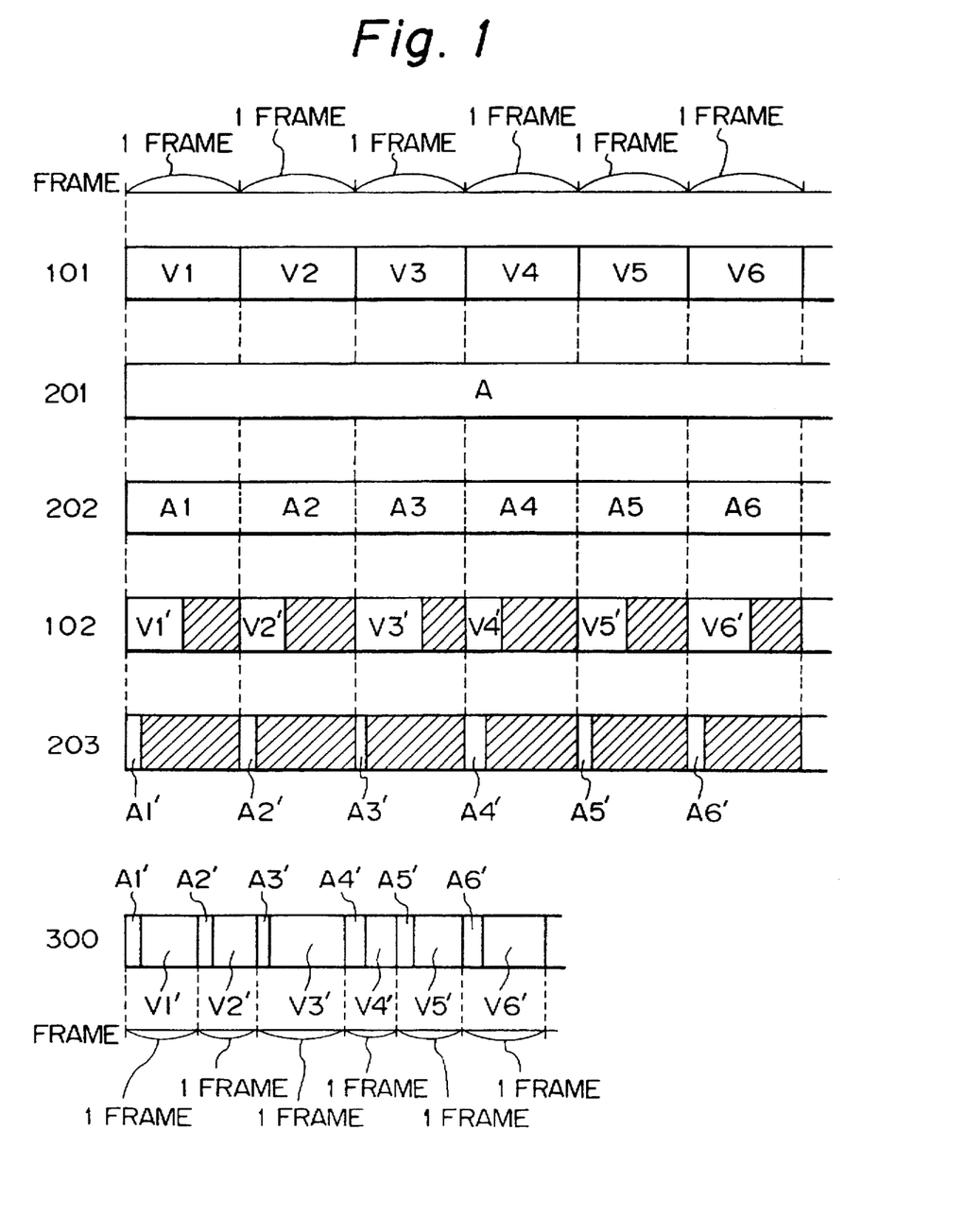
FIG. 1 shows a method of compressing audio and image data frame by fame.
Figure 4:
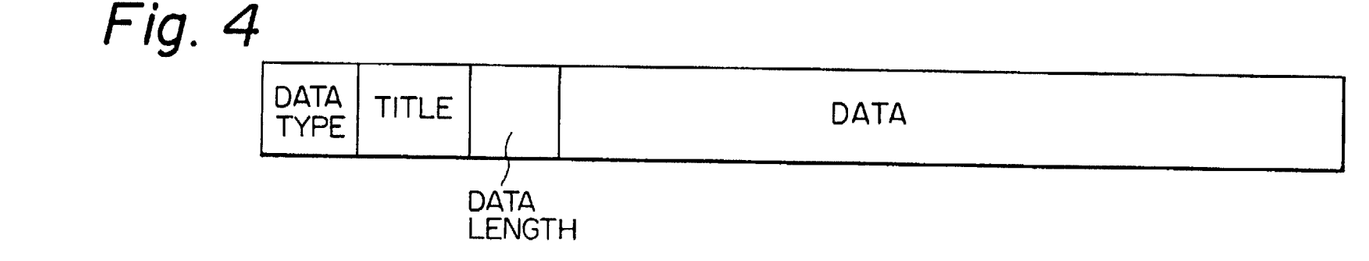
FIG. 4 shows a specific format of audio data of FIG. 1.
Figure 5:
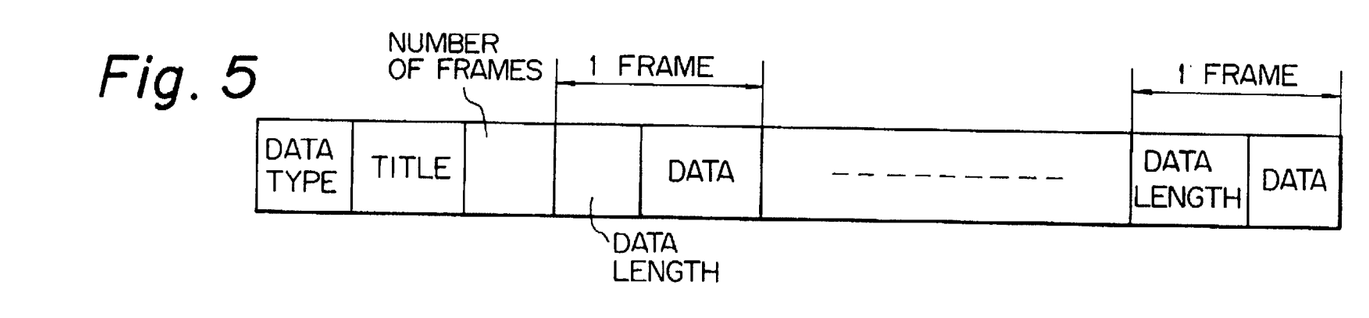
FIG. 5 shows a specific format of video data of FIG. 1.

The audio data 201 of FIG. 1 has a scene-oriented format and, as shown in FIG. 4, constituted by a data type, a title, a data length, and data which are arranged in this order. The data type identifies audio data. The scene-by-scene format of the audio data is adopted since the amount of audio data is generally smaller than that of video data. The audio data has a slightly longer length than the actual scene so that it may be recorded in a CD-ROM together with the video data while alternating with the latter. The audio data has a data length of 8,000 bytes per second or approximately 267 bytes per frame. On the other hand, the video data has a shot-by-shot format. Specifically, as shown in FIG. 5, the video data 101 of FIG. 1 has a data type which is a data identification signal, a title given to the shot, the number of frames included in the shot, and frame-by-frame data lengths and data alternating with each other. The audio and video data are synchronized to each other at the leading end of each scene. Which byte of the audio data as counted from the leading end should lead the scene is instructed at the time of editing the data, and usually it is the first byte.

The audio and video data each having a particular format as stated above and recorded in a CD-ROM are searched by an index file having a hierarchical scene-shot-frame structure. An index file applicable to this embodiment will be described hereinafter.

Figure 6:
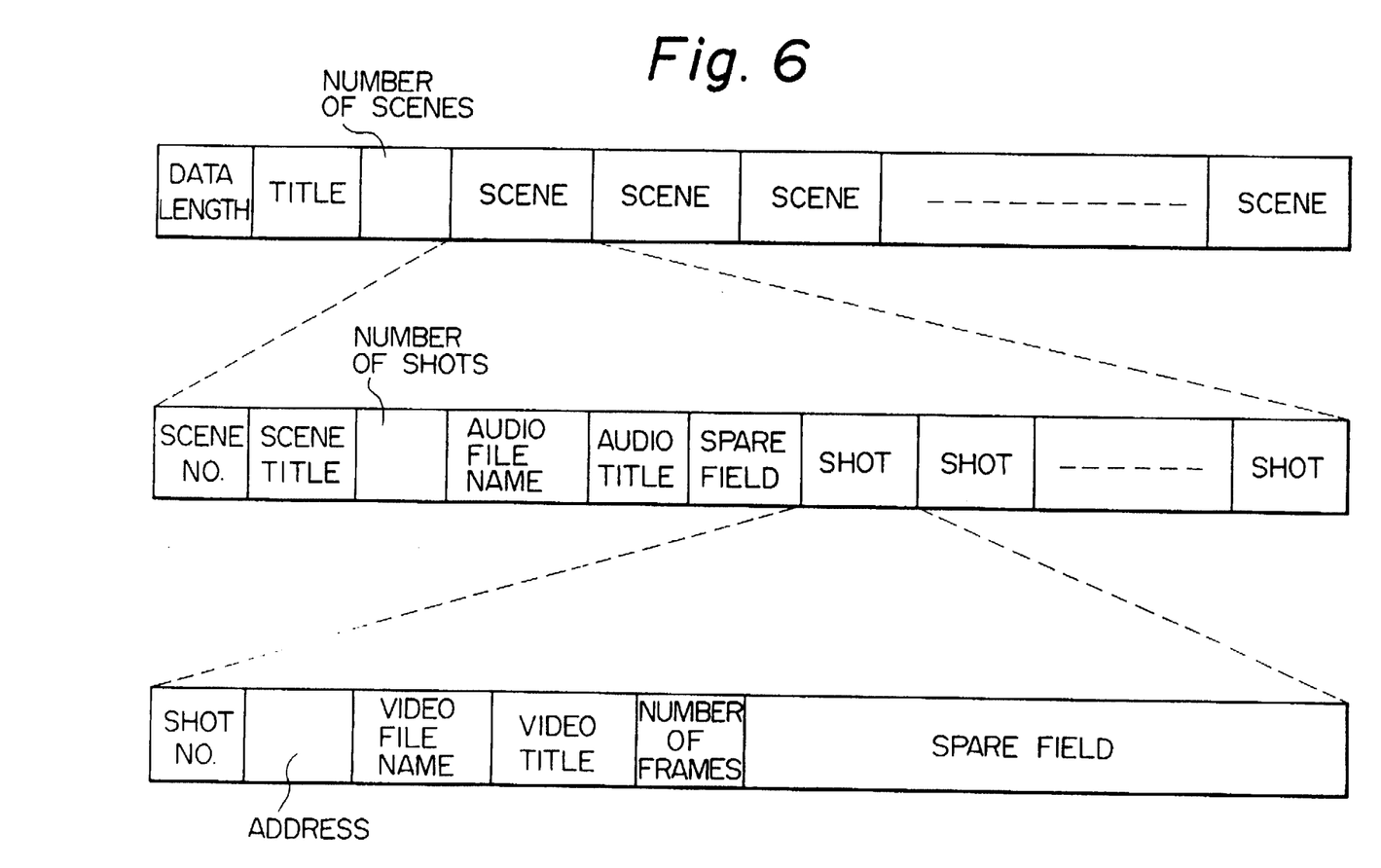
FIG. 6 shows a format of an index file to be recorded together with the data file of FIG. 2.

As shown in FIG. 6, the index file is made up of a data length representative of the size of the file, a title given to the entire file, the number of scenes, and scenes. Each scene has a scene number representative of the position of the scene as counted from the leading end, a scene title, the number of shots included in the scene, audio data used, a title of the audio data, a spare field for extension, and shots. Each shot has a shot number representative of a position of the shot as counted from the leading end of the scene, an address, video data used, a title of the video data, the number of frames included in the shot, and a spare field available for extension. The address is a block address of a CD-ROM and shows the position of the leading end of the shot in terms of block as counted from the leading end of the data file. The leading end of the shot identification data is coincident with the leading end of a block of a CD-ROM, so that the data may be accessed randomly at the time of playback. For this purpose, each shot is selected to be an integral multiple of a block (2,048 bytes).

To record the data file and index file particular to this embodiment as well as to produce and edit them, it is necessary to determine beforehand the filing formats of audio and video data. In the illustrative embodiment, therefore, a predetermined audio and video data file and a CD-ROM file are prepared beforehand, given data is read out of such a file and then edited on the basis of the ROM file, and the edited data is written to the CD-ROM.

Figure 7:
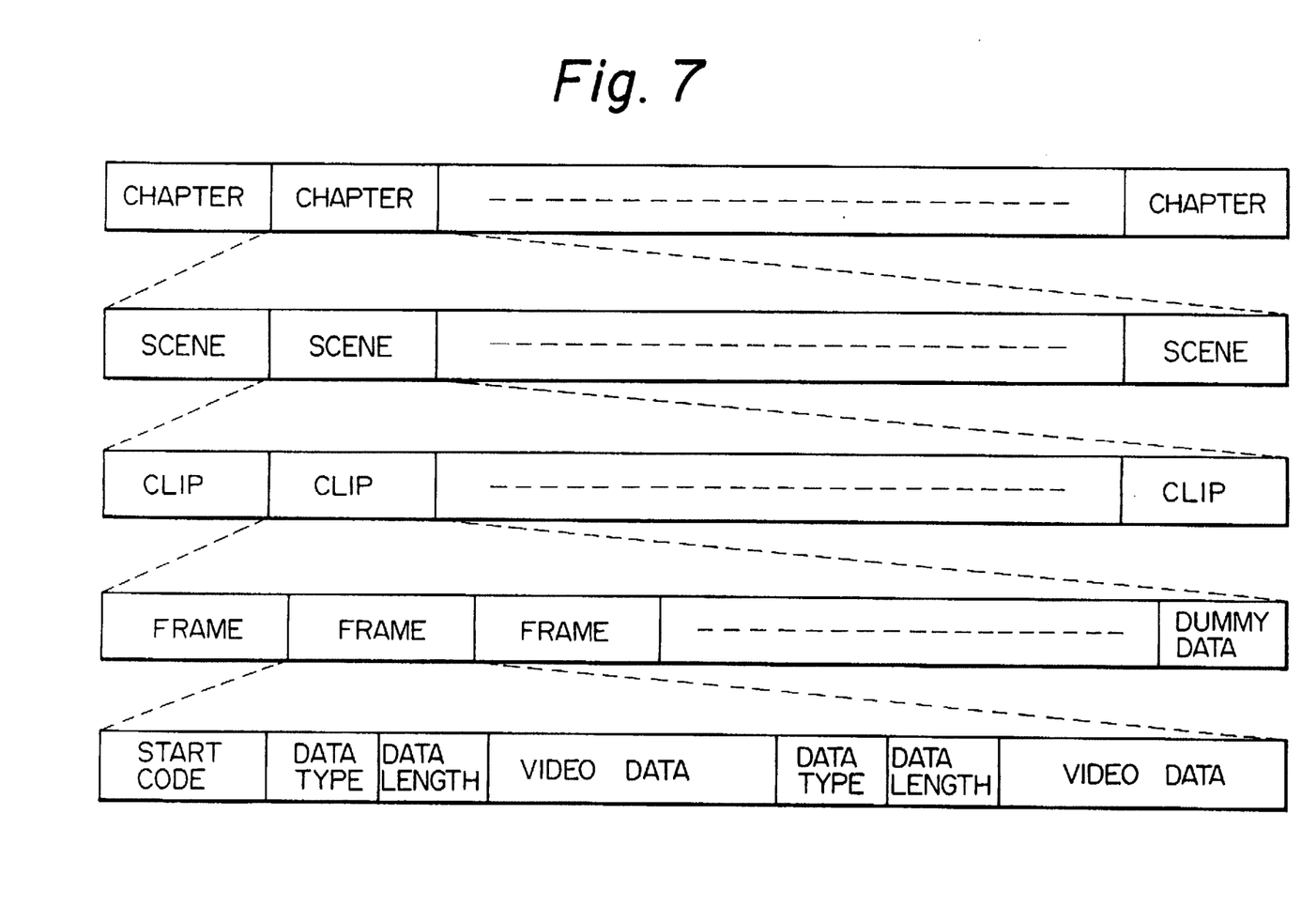
FIG. 7 shows a format of a data file representative of an alternative embodiment of the present invention.
Figure 8:
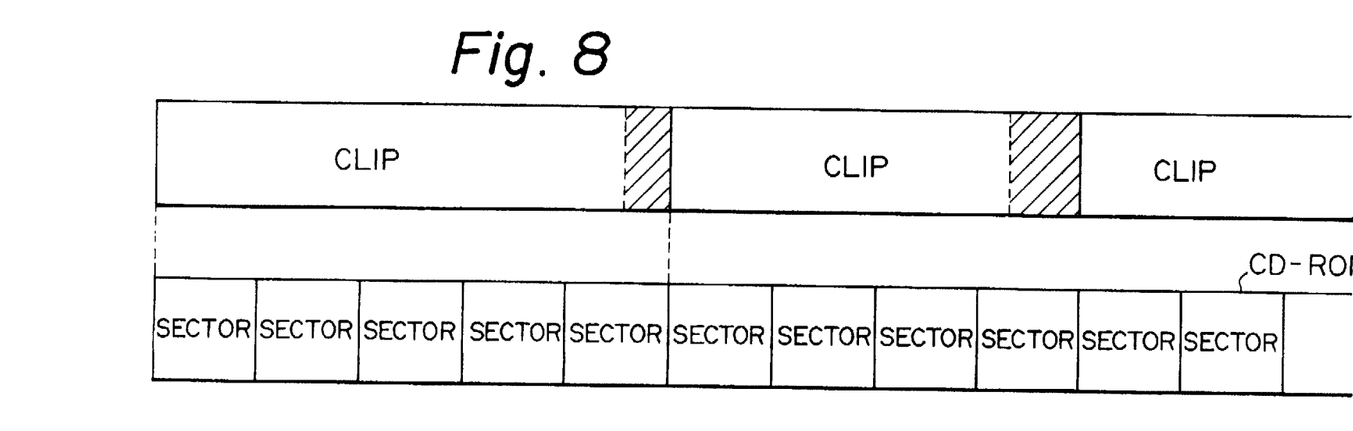
FIG. 8 shows dummy data included in the format of FIG. 7.

Referring to FIG. 7, a data file representative of an alternative embodiment of the present invention will be described. As shown, the data file has one or more chapters each comprising one or more scenes. Each scene has one or more clips each being made up of a sequence of frames and dummy data provided at the trailing end of the frame sequence. As shown in FIG. 8, the dummy data allows the leading end of its associated clip and, therefore, the leading end of the next clip to coincide with the leading end of one sector of a CD-ROM without fail. Should the leading end of a clip begin at the middle of a sector of a CD-ROM, detecting it would be difficult since data stored in a CD-ROM is read out on a sector basis. Each frame has a start code at the beginning thereof, and audio and video data in the form of combinations of data types, data lengths and data. Of course, the data may also include text data or similar data, and its kind is recorded in the data type. The data type may be provided with exactly the same format as the format shown in FIG. 3. If desired, among the eight data bits $b_7$ to $b_0$, the bits $b_7$ and $b_6$ may represent the kind of data, the bit $b_1$ may be a spare bit, the bit $b_0$ may be a link bit, and the bits $b_5$ to $b_2$ may represent a channel number.

Figure 9:
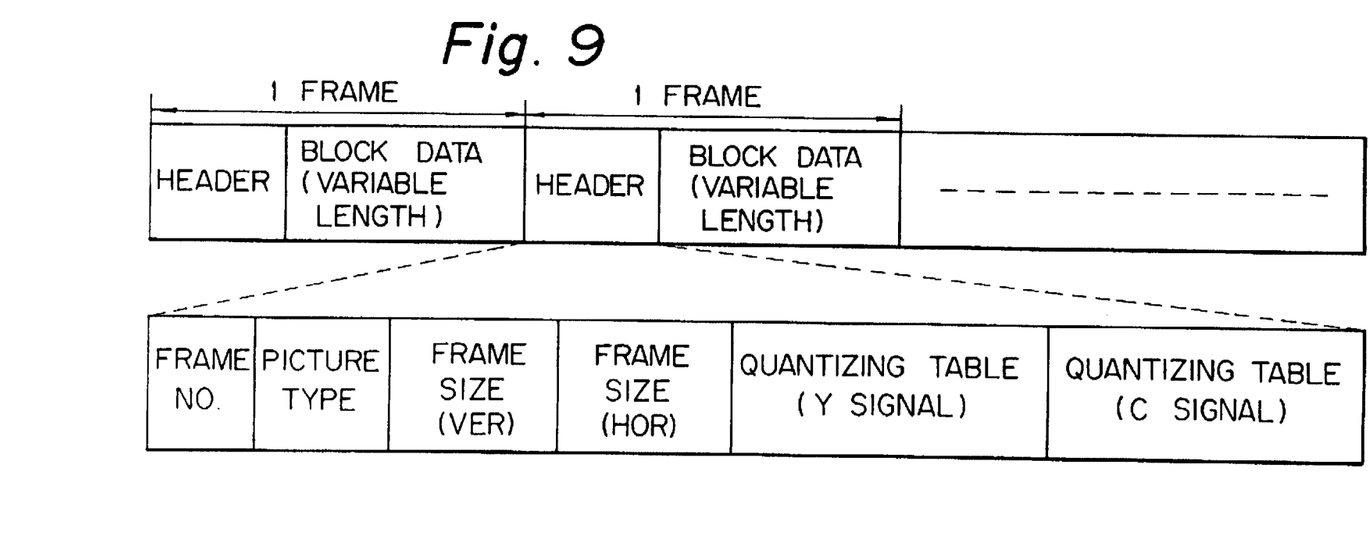
FIG. 9 shows a specific format of video data included in the format of FIG. 7.

As shown in FIG. 9, in the video data, each frame has a header and block data whose length is variable. The header is made up of a frame number, a still/moving picture type, a frame size representative of the number of pixels counted in the horizontal direction of the frame, a frame size representative of the number of pixels in the vertical direction of the frame, and quantizing tables respectively assigned to a Y and a C signal.

Figure 10:
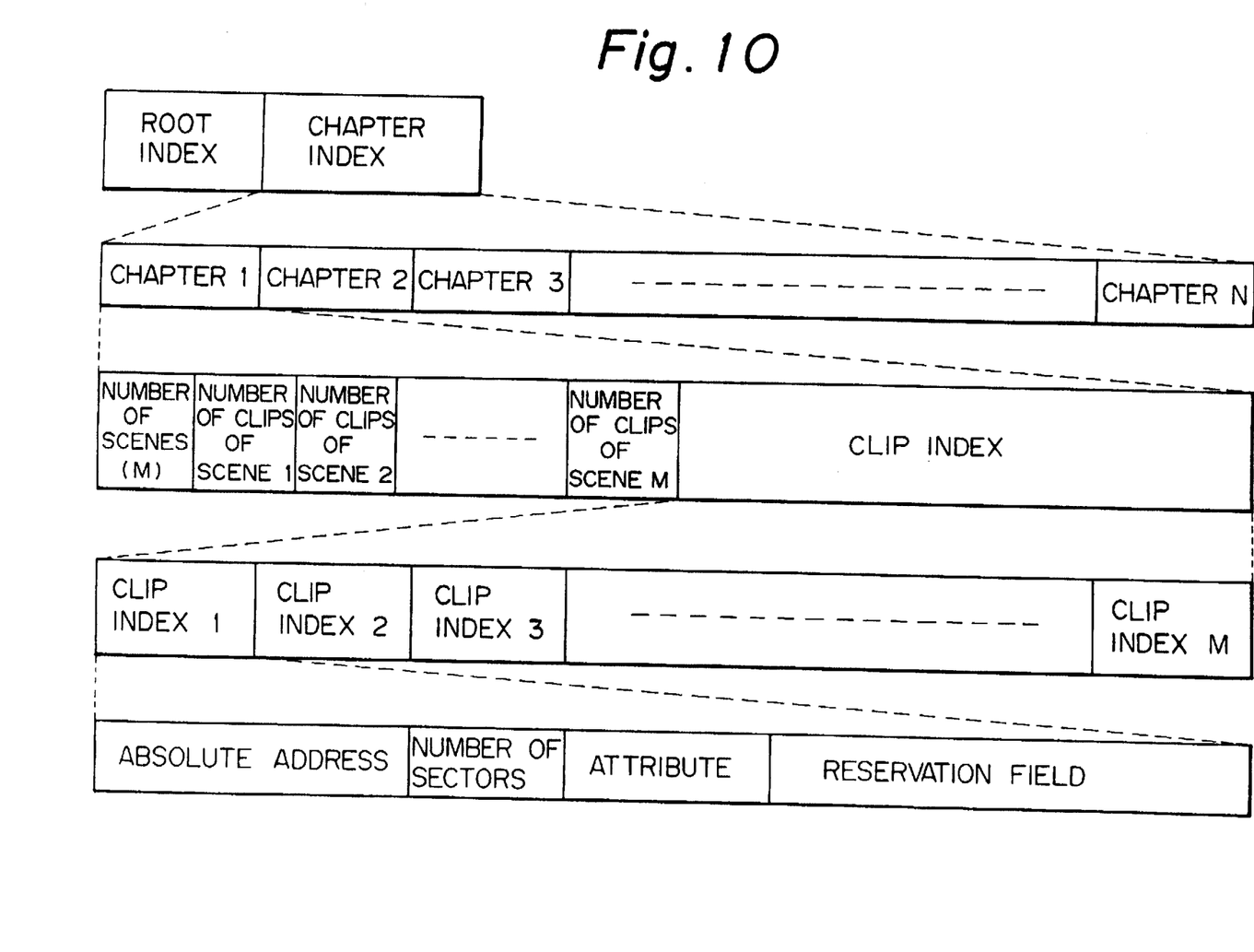
FIG. 10 shows a format of an index file to be recorded together with the data file of FIG. 7, and a specific arrangement of a chapter index thereof.
Figure 11:
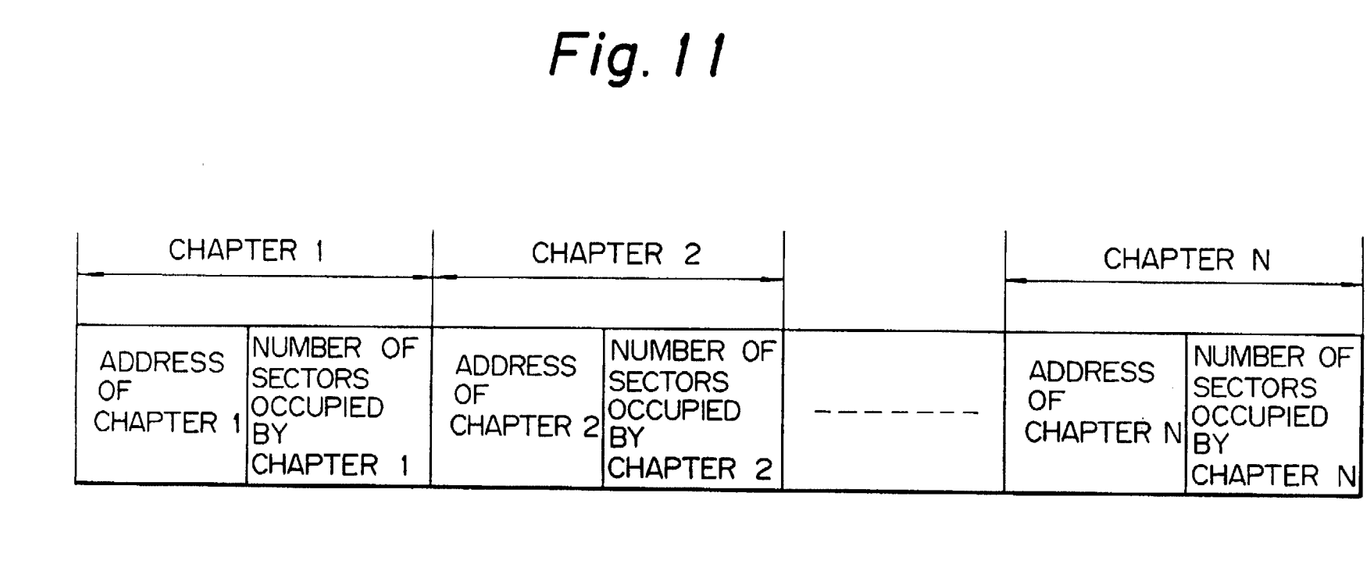
FIG. 11 shows a specific format of a root index included in the index file.

As shown in FIG. 10, an index file of the illustrative embodiment has a root index and a chapter index which is made up of chapters 1 to N. Each chapter, e.g., chapter 1 has the number of scenes (e.g. M chapters), the number of clips constituting each scene, and a clip index. Each clip index, e.g., clip index 1 has an absolute address, the number of sectors, an attribute, and a reservation field. The attribute is representative of the kind of data constituting the clip. As shown in FIG. 11, the root index has chapter addresses each being assigned to respective one the chapters and the numbers of sectors occupied by the individual chapters.

In summary, a data recording system of the present invention having a data file and an index file each having a unique format as described above achieves various unprecedented advantages, as enumerated below.

(1) The index file having a hierarchical format facilitates the management of data.

(2) Different kinds of data each having a variable length can be recorded in a single frame by use of data types and data lengths.

(3) A particular code (start code) leading each frame implements the recovery from data read errors at the time of playback.

(4) A shot or a clip which is the minimum unit for access coincides at the leading end thereof with the leading end of a sector of a recording medium without fail, so that the leading end of a shot or that of a clip can be detected with ease.

(5) Audio and video data are linked on a frame basis and, therefore, can be readily synchronized at the time of playback.

(6) With a link bit which is constituted by the last bit of a data type, it is possible to determine whether or not data being read out is to be followed by another type of data within the same frame.

Various modifications will become possible for those skilled in the art after receiving the teachings of the present disclosure without departing from the scope thereof.

What is claimed is:

1. A recording medium for storing video and audio data of an audiovisual moving picture, said video and audio data having a shot-by-shot format defining shots of said audiovisual moving picture, said shots each having one or more corresponding data frames of said video and audio data, said recording medium comprising:

physical blocks, each of which has a respective leading end;

shot identification data, for each of said shots, disposed at said respective leading end of a corresponding one of said physical blocks, said shot identification data indicating a number of said corresponding data frames disposed in said corresponding physical block;

a respective frame start code for each of said corresponding data frames of said each shot, said respective frame start code being disposed adjacent said each corresponding data frame; and for said each data frame, an audio data type code disposed adjacent said audio data of said each frame, and a video data type code disposed adjacent said video data of said each frame;

wherein said video and audio data of said each frame corresponds in time to a portion of said audiovisual moving picture.

2. A recording medium as claimed in claim 1, wherein at least one of said video data and said audio data comprise compressed data.

3. A recording medium as claimed in claim 1, wherein each of said shots has a particular length.

4. A recording medium as claimed in claim 3, wherein said shot identification data indicates a length of said video data of said each shot.

5. A recording medium as claimed in claim 1, wherein:
each of said physical blocks has a predetermined number of bytes.

6. A recording medium as claimed in claim 5, wherein said each shot includes an idle region at a trailing end thereof so at said each shot has a length which is an integral multiple of said redetermined number of bytes.

7. A recording medium as claimed in claim 5, further comprising an index recording portion for storing at least information representative of a position on said recording medium where the leading end of said each shot and the leading end of said corresponding physical block coincide.

* * * * *